United States Patent [19]

Crees

[11] 3,786,668
[45] Jan. 22, 1974

[54] CABLE BENDING APPARATUS
[76] Inventor: Silas Ray Crees, P.O. Box 813, Eau Gallie, Fla. 32935
[22] Filed: Aug. 18, 1972
[21] Appl. No.: 281,817

[52] U.S. Cl.................... 72/388, 72/318, 72/321, 72/389
[51] Int. Cl............................................. B21d 9/05
[58] Field of Search..... 72/304, 305, 308, 309, 310, 72/318, 319, 369, 387, 388, 157, 217, 218

[56] References Cited
UNITED STATES PATENTS

| | | | |
|---|---|---|---|
| 3,613,430 | 10/1971 | Crees | 72/318 |
| 3,584,493 | 6/1971 | Crees | 72/321 |
| 3,511,074 | 5/1970 | Crees | 72/389 |
| 2,852,064 | 9/1958 | Weber et al. | 72/217 |
| 1,816,218 | 7/1931 | Henry et al. | 72/369 |
| 1,349,219 | 8/1920 | Moore et al. | 72/387 |

Primary Examiner—Richard J. Herbst
Assistant Examiner—James R. Duzan
Attorney, Agent, or Firm—Duckworth, Hobby & Allen

[57] ABSTRACT

A wire bending apparatus for bending electrical cables, or the like, in narrow confines such as panel boxes. The apparatus is connected to an electrical conductor by placing three separate wire engaging members, each of which is connected to a hydraulic cylinder, against the wire, and actuating the hydraulic cylinder to bring the wire-engaging members into engagement onto the wire. Continued actuation of the hydraulic cylinder then bends the wire to any desired bend.

10 Claims, 6 Drawing Figures

PATENTED JAN 22 1974 3,786,668

CABLE BENDING APPARATUS

BACKGROUND OF THE INVENTION

The present invention relates to wire benders and more particularly to a hydraulically actuated electrical conductor bender adapted to bend an electrical conductor inside a panel box, junction box, switchboard, or the like.

In a typical electrical contracting job, conduit is connected to panel boxes after installation of the boxes and electrical wire or cable is pulled taut through the conduit and fastened to the box. When heavy conductors are used, a steel fish tape may be needed to draw the cable through the conduit and the cable may be pulled tight using block and tackle or special machines including winches for pulling the cable tight. Once the conductors are installed in conduits, raceways, junction box, panel box, or the like, they may be bent to the desired degree and into proper position. They are then cut to length for fastening to terminals within the box. When heavy cable is being used, it becomes very difficult to bend the cable within a box, or the like, in narrow confines. This in turn results in damage to cable, wasted time, and expensive cable as well as strenuous working conditions.

In the past various types of hickeys and benders have been used to bend thin-walled and rigid conduits. These benders are sometimes bench types and may be hydraulically operated to bend the conduit for installation. These devices, however, are not generally useful for bending the ends of heavy conductor cables for connection to various types of connectors. For instance, the benders are large, relatively bulky devices that cannot be used in tight quarters such as those encountered when working inside panel and junction boxes, and the like. These benders generally are made for inserting a piece of conduit prior to installation, then gripping it in some manner at one point and applying force to another point on the pipe to bend it around a curved guide having a predetermined radius to bend the pipe at a desired curvature which must be large enough to prevent collapse of the pipe at the bend.

Machines have also been suggested in the past for bending metal rails, beams, bars, and the like. One such machine is used in the manufacture of chain links and is, of course, bulky and for use only in a manufacturing plant. Another such device is used in the manufacture of springs and yet another such machine is used to bend rails in train tracks and other very heavy metal stock.

One of the first patents to deal specifically with the problem of bending electrical cables in narrow confines may be seen in U. S. Pat. No. 3,511,074 by the present inventor in which a hydraulically actuated lever was fulcrummed on a frame and driven against an electrical cable held between a pair of guides also connected to the frame. This wire bender was followed by a wire bending apparatus as illustrated in U.S. Pat. No. 3,584,493 by the present inventor in which supporting blocks were placed on an electrical cable to hold the apparatus and then connected to a hydraulic cylinder which drove a bending lever. In this apparatus, the hydraulic cylinder could be placed in a panel box and remain in substantially the same position during the bending of the cable on the supporting blocks.

Finally, U. S. Pat. No. 3,613,430, by the present inventor, provided a wire bending apparatus in which the hydraulic cylinder followed the electrical cable during bending and had one of the cable engaging members connected directly thereto for pushing the cable with the cylinder to bend the cable around a pair of cable-engaging members connected together. The present invention is an improvement over the above patents, and similar to U.S. Pat. No. 3,613,430, it has the actuating means directly driving the bending of cable and following the cable during the bend. However, the present invention advantageously provides a wire bending apparatus which both engages the electrical cable by the actuation of a hydraulic cylinder, or the like.

SUMMARY OF THE INVENTION

The present invention is a wire-bending apparatus for bending electrical cables, and the like, in tight spots such as in panel boxes, and has an actuating means such as a hydraulic cylinder with an extendable and retractable rod. Three cable engaging members are provided all being attached to the hydraulic cylinder with one cable engaging member being directly connected to the cylinder for engaging the wire for bending the wire relative to the other two wire engaging members. A second wire engaging member is movably connected to the extending and retracting rod of the cylinder and also to the third wire engaging member. The third wire engaging member is connected by linkage to the hydraulic cylinder or to the first cable engaging member so that placing the apparatus onto a cable and actuating the cylinder will drive second and third engaging members toward each other for engaging the cable between them and continued actuation of the cylinder will drive the first wire engaging member against the cable and bend the cable relative to the second and third wire engaging members.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
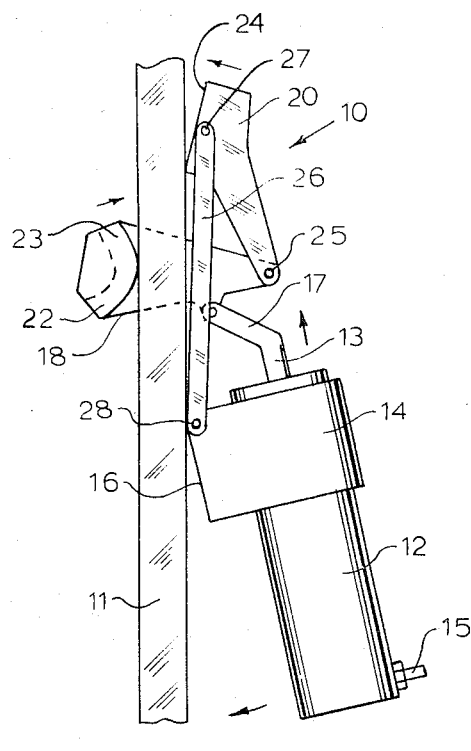
FIG. 1 is a side elevation of the present invention being placed on an electrical conductor.
Figure 2:
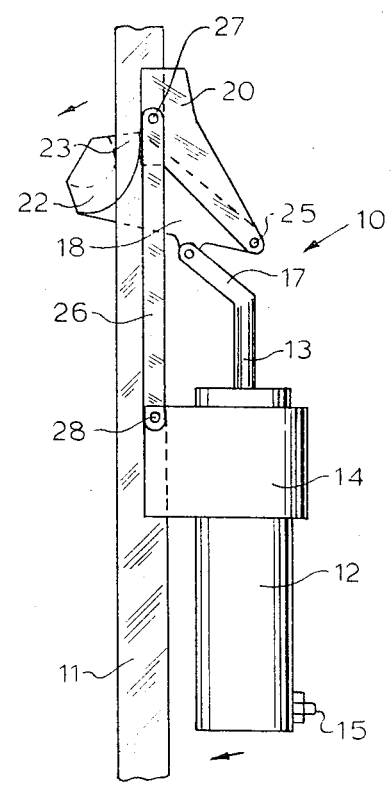
FIG. 2 is a side elevation of the embodiment of FIG. 1 having engaged the electrical cable.
Figure 3:
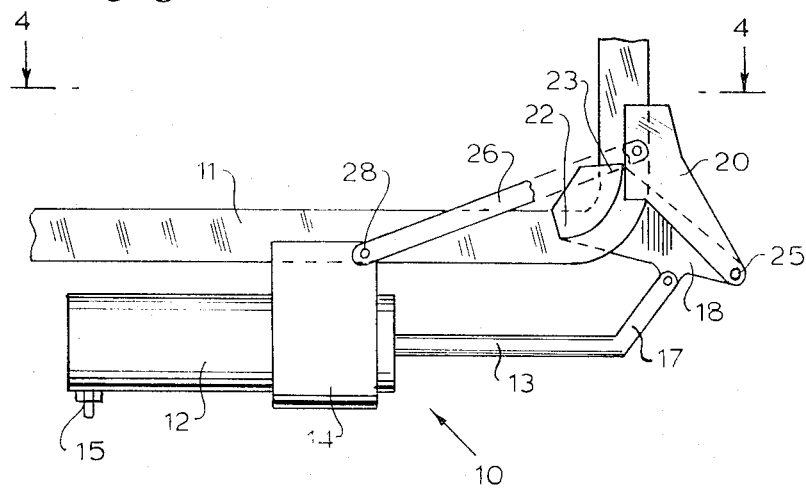
FIG. 3 is a side elevation of the embodiments of FIGS. 1 and 2 having bent the electrical cable.

FIGS. 1, 2 and 3 illustrate a preferred embodiment of the present invention illustrating a sequence of operation and are herein described together. FIG. 1 illustrates the wire bending apparatus 10 being placed on an electrical cable 11, while FIG. 2 illustrates the apparatus 10 having engaged the cable 11 by the actuation of the hydraulic cylinder 12, and FIG. 3 illustrates the apparatus 10 having bent the cable 11 to the desired bend. The wire bending apparatus 10 has a hydraulic cylinder 12 which could of course be a pneumatic or electrically operated actuating system, if desired, without departing from the spirit and scope of the invention. At any rate the cylinder 12 has a cylinder rod 13 adapted to be extended from and retracted into the cylinder 12. The cylinder 12 has a bracket 14 rotatably attached thereto but which of course could be fixedly attached to the cylinder 12, if desired. However, by having the bracket 14 rotatably attached and by having the rod 13 capable of being rotated within the cylinder 12, additional flexibility can be given to the system since all of the remaining parts are connected to the cylinder 12 by these two parts which can be rotated together. The cylinder 12 is illustrated having a hydraulic input or drive line 15 so that the cylinder may be driven from a different point by a hydraulic pump. Bracket 14 has an arcuate or sheave-like wire engaging portion 16 adapted to cradle the cable 11 therein when the hydraulic cylinder is driven against it. Rod 13 is illustrated having a curved or bent end portion 17, even though it will be understood that the shape of the end of rod 13 depends on the design of a pair of wire engaging members 18 and 20. The end of rod 13 is movably connected to wire engaging member 18 by a pin 21 which allows the rod 13 to drive member 18 during its extension and retraction. Member 18 has a curved cable bending guide 22 which may be an arcuate or sheaved like member for cradling and gripping the cable 11 at 23 and then bending the cable around the remainder of the wire guide 22. The third wire engaging member 20 similarly has an arcuate or sheave like member 24 for cradling and gripping the cable 11 therein so that the cable is engaged between the portion 23 of the guide 22 and the arcuate portion 24 of the engaging member 20 for locking the wire bending apparatus 10 to the cable 11. Member 20 is movably connected to member 18 by a pin 25 and is also connected to a pair of links 26 by pin 27. Link 26 is connected at its other end by a pin 28 to the cylinder 12, bracket 14. Members 26 could of course be connected directly to the cylinder 12, but would normally have to have some form of connecting bracket so that bracket 14 is utilized in a dual role as providing a connection for members 26 to the cylinder 12, while providing the wire engaging surface 16 for engaging the wire 11 directly to the cylinder 12 during the bending operation.

In operation, the wire bending apparatus 10 is slipped onto cable 11 as shown in FIG. 1, with the cylinder 12 along with the bracket 14 and wire engaging member 20 on one side of the cable, and the bending guide 22 portion of wire engaging member 18 on the other side. The hydraulic cylinder is then actuated to bring the cable engaging members 18 and 20 towards each other for engaging the cable 11 therebetween and holding the cable in the arcuate wire engaging portions 23 and 24 of members 18 and 20 respectively. Continued actuation of the cylinder 12 will attempt to drive these portions 23 and 24 tighter against the cable and will force the cylinder 12 to move towards the cable 11 to engage the arcuate wire engaging section 16 of bracket 14 thereagainst. At this point the apparatus 10 is fully engaged to the cable 11 as shown in FIG. 2. Continued actuation of the cylinder continues to drive bushings 23 and 24 of members 18 and 20 tighter on the cable 11, and also drives the cylinder 12 away from the members 18 and 20. This in turn forces the cylinder to drive further against cable 11 by the link 26 always maintaining a predetermined distance between its connections to the cylinder 12 and to the member 20 thus forcing the cylinder to bend the cable 11 relative to its engagement between members 18 and 20 and around the guide portion 22 which allows the cable to bend at a predetermined angle of curvature. At this point the cylinder rod 13 is retracted to release the apparatus from the cable 11 for removal. It should be noted, however, that the cylinder 12 is parallel to the cable 11 and maintains itself parallel during the bending. It should also be observed that the whole apparatus closely wraps around the wire both before and after the bend so as to take a minimum of space in narrowly confined sections and not to interfere with other parts located in the narrow confines.

Figure 4:
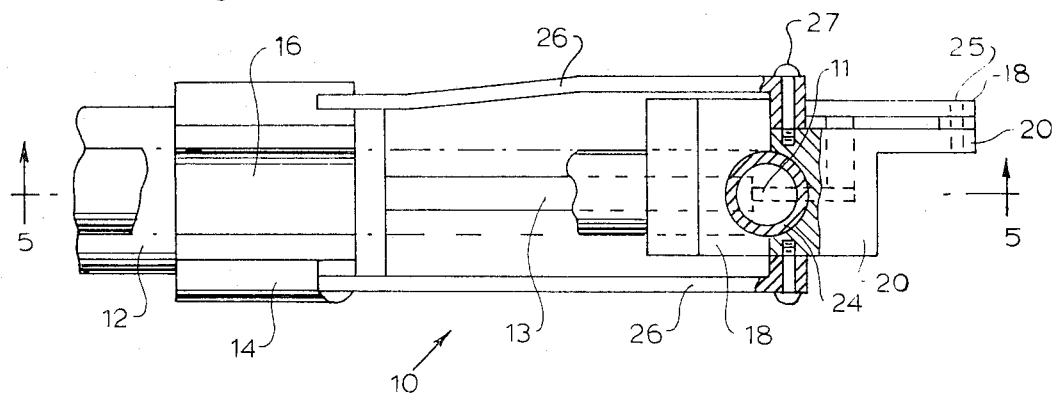
FIG. 4 is a sectional view taken on the line 4—4 of FIG.3.

FIG. 4 shows the apparatus 10 having a cylinder 12 and being attached to a cable 11. The bracket 14 can be seen having the arcuate cable cradling portion 16 and also having pins 28 engaging a pair of link members 26 which are in turn pinned with pins 27 to member of the wire engaging member 20, also having an arcuate surface 24. The cylinder rod 13 is connected to the wire engaging member 18 which also has an arcuate surface 22 which guides the bending of the wire, as already described. This view also illustrates pin 25 connecting the members 18 and 20 at a single extended or protruding portion of the members 18 and 20. It should of course be clear that these two members could be connected with a yoke connection or any other connecting means desired but would have to be movably connected to each other whether directly connected or connected with some type of linkage.

Figure 5:
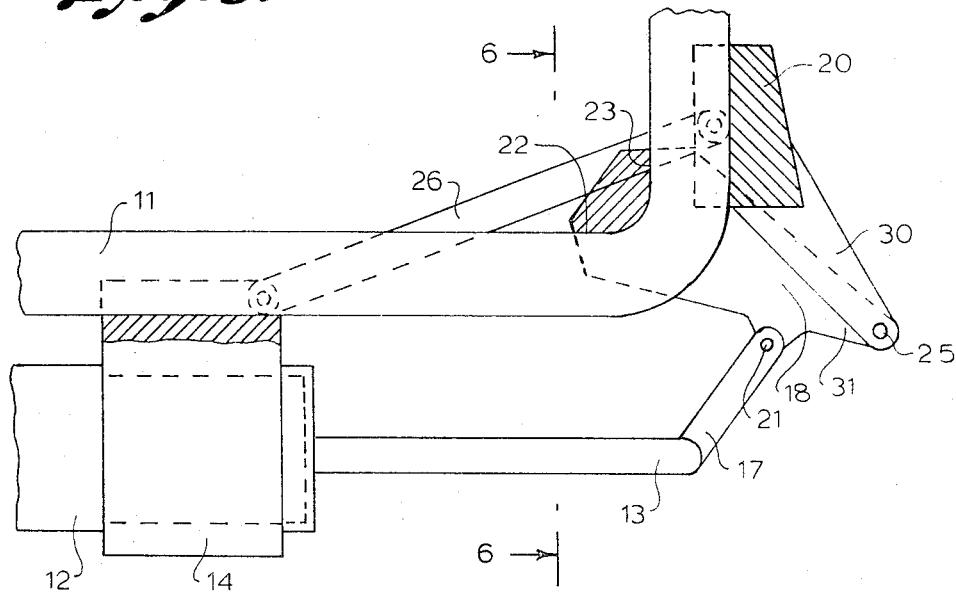
FIG. 5 is a sectional view taken on the line 5—5 of FIG. 4.

FIG. 5 has the cylinder 12 with its bracket 14 connected to links 26 and rod 13 connected to member 18 and more clearly shows the wire guide 22 of member having a wire engaging portion 23 for bending the cable 11 in accordance with the curvature of the wire bending guide 22. Wire engaging member 20 is seen in block form and is fixedly connected to a protruding portion 30 thereon, while member 18 has a protruding portion 31 to provide a connecting pin 25 for connecting the two members 18 and 20 together. Rod 13 with its crooked portion 17 is connected by pin 21 to member 18.

Figure 6:
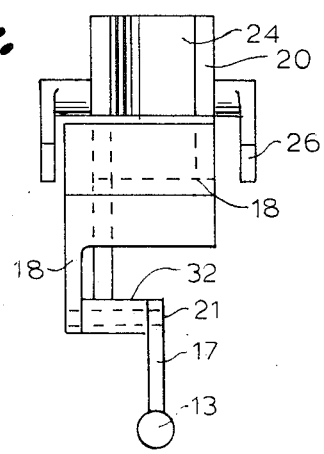
FIG. 6 is a sectional view taken on the line 6—6 of FIG. 5.

FIG. 6 more clearly shows the arcuate wire engaging portion 24 of the member 20, and having links 26 pinned thereto with the back portion of the wire guide member 18 and a portion of the rod 13 which is shown to be cylindrical shaped, having a flat end portion 17 connected thereto and to member 18 by a connecting portion 32 having a pin 21 passing therethrough for locking the members together.

It should be clear at this point that an improved electrical conductor bender for bending electrical cables in narrow confines has been provided. It should also be clear that the apparatus can be made from any materials desired, but will customarily be made of mostly steel components utilizing commercially available hydraulic cylinders driven by commercially available hydraulic pumps. Steel is especially desirable for most of the components in the present invention because of the forces encountered, but other materials such as bronze can be utilized with certain components, and it might also be desirable to coat some of the components, if desired. In any event, the invention is not to be construed as limited to the particular forms disclosed herein since these are to be regarded as illustrative rather than restrictive.

I claim:

1. A bending apparatus for bending cable, or the like, comprising in combination: actuating means for actuation of said bending apparatus to bend an elongated member, said actuating means having an extendable and retractable rod; first and second elongated member engaging members each located to be moved toward each other onto an elongated member located therebetween; said first engaging member being movably connected to said extendable and retractable rod; and said second engaging member being movably connected to said first engaging member and movably connected to said actuating means; third engaging member connected to said actuating means for engaging said elongated member during bending whereby actuation of said extendable and retractable rod will drive said third engaging member in relation to said first and second engaging members to bend an elongated member.

2. The apparatus according to claim 1 in which said second engaging member is connected by a link to said actuating means.

3. The apparatus according to claim 2 in which said link is connected to a bracket attached to said actuation means, said bracket having said third engaging member formed therein.

4. The apparatus according to claim 3 in which said actuation means is a hydraulically actuated cylinder with said bracket rotatably attached thereto.

5. The apparatus according to claim 1 in which said first engaging member includes a wire bending guide section for guiding the bending of an elongated member in said bending apparatus.

6. The apparatus according to claim 5 in which said first, second and third engaging members each having an arcuate surface for cradling an elongated member therein during bending thereof.

7. The apparatus according to claim 1 in which said first, second and third engaging members are actuated by said actuating means to force said first, second and third engaging members into engagement with said elongated member.

8. The apparatus according to claim 7 in which said first, and second members have extending portions movably pinned together.

9. The apparatus according to claim 8 in which said extendable and retractable rod of said actuating means has an angled end portion movably pinned to said first engaging member.

10. An elongated member bending apparatus comprising in combination:
   actuating means for actuation of said bending apparatus to bend an elongated member and having an extendable and retractable rod;
   at least three elongated member engaging members;
   at least one said engaging member being movably connected to said extendable and retractable rod and at least one other said engaging member being connected to said actuation means;
   linkage means connecting two said engaging members for movement relative to each other;
   at least two said engaging members being movably connected to each other whereby actuation of said actuating means will move said engaging members into contact with an elongated member placed between at least two said engaging members and bend said elongated member; and
   said actuation means being a hydraulic cylinder and one said engaging member being movably connected to said extendable and retractable rod and to one other engaging member and said linkage means being movably connected to said one other engaging member and to a third engaging member and said third engaging member being attached to said hydraulic cylinder.

* * * * *